Sept. 12, 1961  J. PICKLES  2,999,683
AUTOMATIC LUGGAGE COMPARTMENT LID CONTROL SYSTEM
Filed Dec. 23, 1958  2 Sheets-Sheet 1

INVENTOR.
JOSEPH PICKLES
BY Whittemore
Hulbert & Belknap
ATTORNEYS

Sept. 12, 1961 J. PICKLES 2,999,683
AUTOMATIC LUGGAGE COMPARTMENT LID CONTROL SYSTEM
Filed Dec. 23, 1958 2 Sheets-Sheet 2
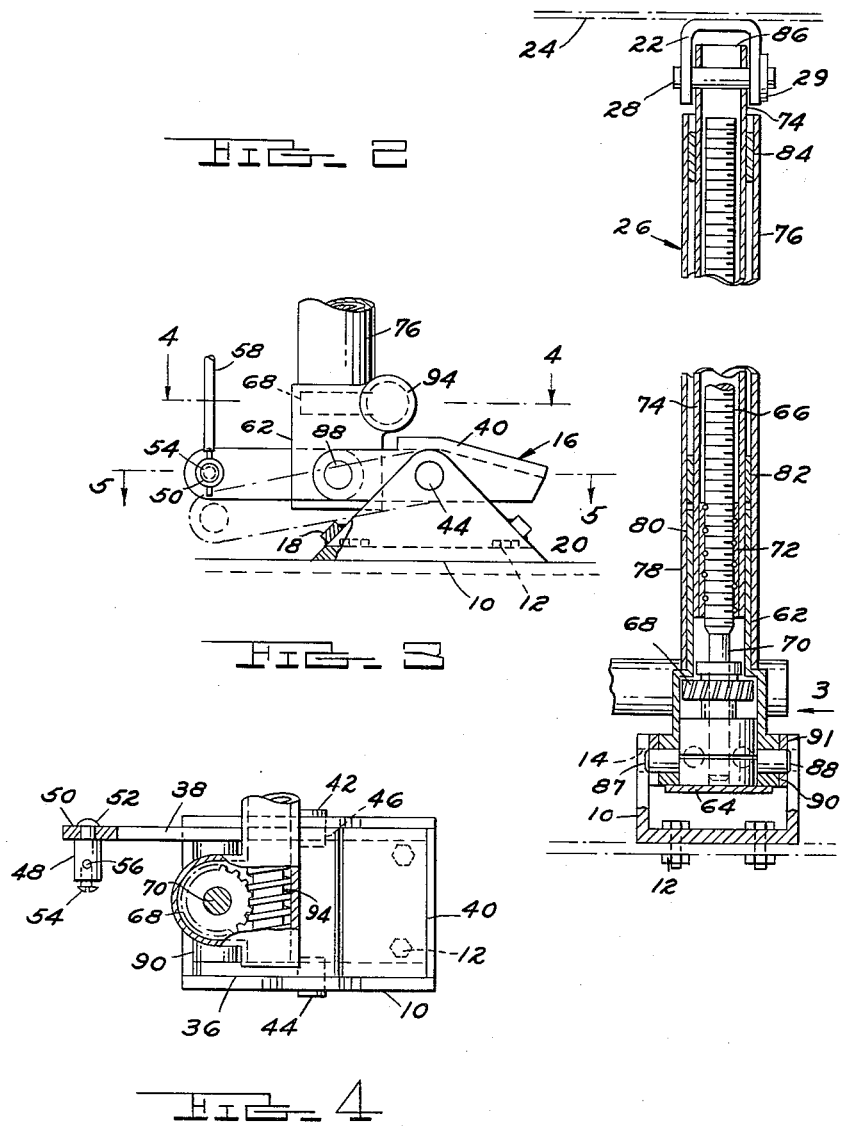

United States Patent Office 2,999,683
Patented Sept. 12, 1961

2,999,683
AUTOMATIC LUGGAGE COMPARTMENT
LID CONTROL SYSTEM
Joseph Pickles, Dearborn, Mich., assignor to Ferro Stamping Company, Detroit, Mich., a corporation of Michigan
Filed Dec. 23, 1958, Ser. No. 782,440
2 Claims. (Cl. 268—74)

This invention relates to an automatic luggage compartment lid control system and refers more particularly to a control system for the luggage compartment lid of a vehicle which will allow manual or automatic operation of the lid and includes means operably associated with means providing automatic operation for automatically unlatching the luggage compartment lid.

It is often necessary to operate the luggage compartment lid of a vehicle under conditions where automatic operating means would be desirable. Examples of such conditions are in permitting inspection at state lines and foreign borders and in allowing service of spare tires. Automatic luggage compartment lid operation is also desirable in drive in delivery of packages. In the past it has generally been necessary in situations such as these to obtain a key to unlatch the luggage compartment lid, unlatch the lid, manually raise the lid and manually close the lid. Even where automatic operation of the lid was provided for in the past it often required the lid to be left unlatched or did not allow manual operation if desired or both.

Therefore it is one of the essential objects of this invention to provide automatic means to operate the luggage compartment lid of a vehicle.

It is a further object to provide automatic means to operate the luggage compartment lid of a vehicle which will also permit manual operation of the lid.

It is a further object to provide automatic means to operate the luggage compartment lid of a vehicle which will permit the latching of the lid.

It is a still further object to provide an automatic operating mechanism for operation of a hinged panel.

Another object is to provide an automatic operating mechanism for a hinged panel comprising extensible screw means attached between the panel and a fixed surface and means operably associated with the extensible screw for unlatching the hinged panel.

Another object is to provide an automatic control system for vehicle luggage compartment lids, comprising lid latch actuating means pivotally mounted on the floor of the luggage compartment, an extensible screw attached at one end to the luggage compartment lid and at the other to the latch actuating means and means for extending said extensible screw.

Still another object is to provide an automatic control system for a hinged panel which is simple in construction, easy to manufacture and efficient in use.

Other objects and features of the invention will become apparent as the description proceeds, especially when taken in conjunction with the accompanying drawings, illustrating a preferred embodiment of the invention, wherein:

FIGURE 2 is a longitudinal section of the control system of FIGURE 1 taken on line 2—2 in FIGURE 1.

FIGURE 3 is a partial elevation of the control system of FIGURE 1 taken as indicated by arrow 3 in FIGURE 2.

FIGURE 4 is a cross-section of the control system of FIGURE 1 taken on line 4—4 in FIGURE 3.

Figure 1:
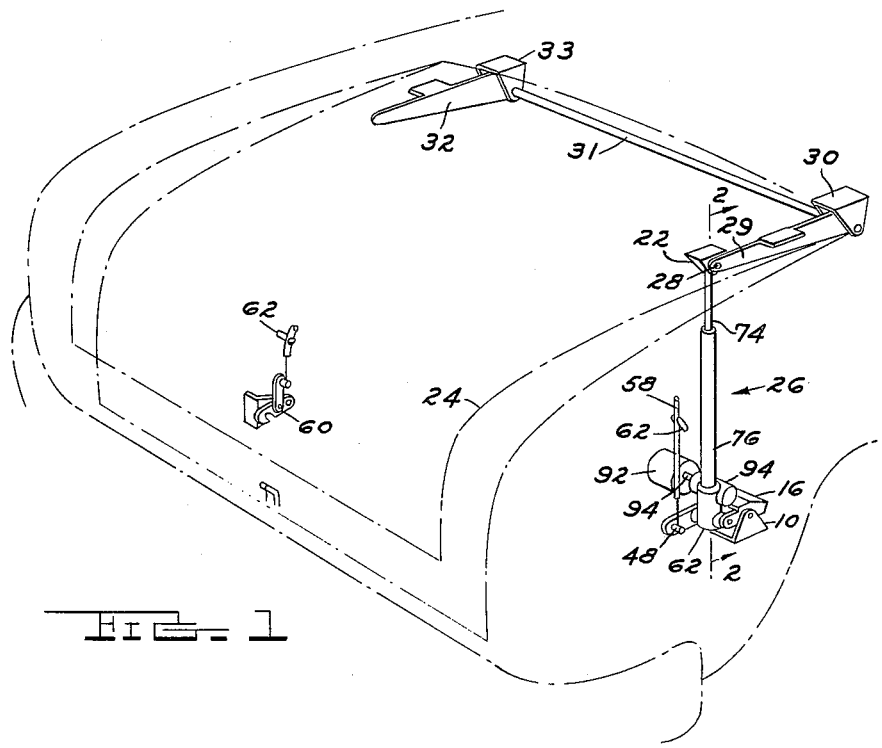
FIGURE 1 is a perspective view of the automatic control system of this invention installed between the floor of the luggage compartment and luggage compartment lid of an automobile.
Figure 5:
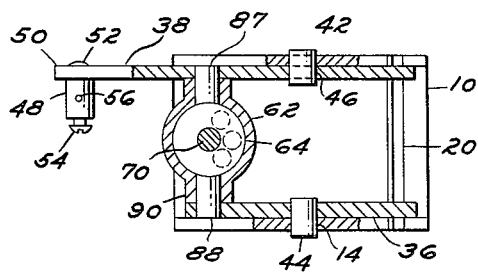
FIGURE 5 is a cross-section of the control system of FIGURE 1 taken on line 5—5 in FIGURE 3.

One embodiment of the present invention is illustrated in the drawings and includes a mounting bracket secured to the floor of the luggage compartment of a vehicle, a lever pivotally mounted at one end in the bracket, a lid latch release cable attached to the other end of the lever, a second bracket secured to the luggage compartment lid, an extensible screw pivotally attached at one end to the second bracket and at the other end to the lever between the latch release means and the first mentioned bracket and means for driving the extensible screw whereby as the screw is extended the lever pivots about the first mentioned bracket unlatching the lid latch and on further extension of the screw the luggage compartment lid is opened.

Mounting bracket 10 as illustrated is generally U-shaped and has triangular upstanding sides. It is adapted to be attached to the floor of the luggage compartment of a vehicle by suitable means such as bolts 12. Openings 14 are provided in the upstanding sides of the bracket 10 as shown to permit the pivotal mounting of lever 16 between the sides. Stops 18 and 20 are provided on brackets 10 extending between the upstanding sides thereof to limit the pivotal movement of lever 16.

A second mounting bracket 22 is provided and is illustrated attached to the luggage compartment lid 24 of a vehicle in FIGURE 1. Bracket 22 is also generally U-shaped. It may be attached to lid 24 by spot welding or other suitable means. Openings are provided in the outstanding sides of bracket 22 to facilitate the pivotal connecting of extensible screw 26 between the sides of the bracket with pivot pin 28 as shown.

One end of the luggage compartment lid hinge arm 29 is also pivotally connected to pin 28 as indicated in FIGURE 2. Hinge arm 29 as shown in FIGURE 1 is pivotally connected to the lid mounting bracket 30 and rigidly connected to one end of torsion bar 31 at its other end. Torsion bar 31 extends across the width of the luggage compartment lid as shown and is rigidly connected to lid hinge arm 32 at its other end. Hinge arm 32 is pivotally connected to lid mounting bracket 33 as shown in FIGURE 1. Hinge arms 29 and 32 are also secured to the luggage compartment lid in the usual manner such as by spot welding. Torsion bar 31 is provided to transmit torque from arm 29 to arm 32 on application of a lifting force to arm 29 through extensible screw 26.

Lever 16 is constructed in the form illustrated of a short arm 36, a long arm 38 and a connecting member 40. Connecting member 40 is attached between arms 36 and 38 by any suitable means such as welding. Lever 16 is pivotally mounted between the sides of bracket 10 by means of pivot pins 42 and 44 extending through openings 14 in bracket 10 and similar openings 46 in arms 36 and 38 of lever 16. A short cylindrical member 48 is attached to end 50 of the long arm 38 of lever 16 by suitable means such as rivet head 52. Cylindrical member 48 includes a set screw 54 in the free end thereof as shown and a passage 56 extending crosswise therethrough. The relationship of the set screw 54 and hole 56 are such that a cable 58 inserted through passage 56 may be securely held in place by screw 54.

Cable 58 as indicated is securely attached to end 50 of arm 38 of lever 16. Cable 58 extends from end 50 of arm 38 to latch 60 on the lid 24. Suitable mounting brackets indicated at 62 are provided attached to the vehicle structure as guides for cable 58. The connection between cable 58 and latch 60 is such that tension applied to cable 58 will unlatch latch 60. The arrangement of cable 58 and lever 16 is such that pivoting of lever 16 counterclockwise around pins 42 and 44 applies tension to cable 58.

Extensible screw 26 includes a gear housing 62, a thrust bearing 64 positioned as shown in the gear housing 62 and a screw shaft 66 with a drive gear 68 attached to the shank 70 thereof rotatably mounted in bearing 64. Extensible screw 26 also includes a high efficiency ball nut 72 secured to extensible tube 74 and operably mounted on screw shaft 66 to extend or retract tube 74 on rotation of shaft 66. Ball nut 72 is of the type to permit either manual or automatic extension or retraction of extensible tube 74. A housing tube 76 is provided as illustrated best in FIGURE 2 surrounding screw shaft 66 and extensible tube 74. End 78 of housing tube 76 is inserted over end 80 of gear housing 62. Guide rings 82 and 84 are secured to an extensible tube 74 and housing tube 76 in the position shown to align extensible tube 74. End 86 of extensible screw 26 is pivotally secured to bracket 22 by pivot pin 28 passing through tube 74 as illustrated. The other end of screw 26 is pivotally mounted on lever 16 between bracket 10 and cable 58 by means of pivot pins 87 and 88 held in bosses 90 on gear housing 62 and extending through openings 91 in arms 36 and 38 of lever 16.

Drive means for extensible screw 26 are provided as indicated in FIGURE 1. A reversible electric motor 92 operable by means of the vehicle battery and a switch (not shown) which may be conveniently located in the vehicle is provided in driving relation to worm gear 94. Worm gear 94 also located in gear housing 62 as indicated in FIGURE 4 is connected to motor 92 through shaft 94 and coacts with gear 68 to rotate screw shaft 66 when motor 92 is energized. Suitable means (not shown) such as limit switches should be provided to deenergize the motor when lid 24 is fully opened or fully closed to prevent damage to gears 68 and 94.

In operation, with the luggage compartment lid closed and latched it is desired to open the lid. A switch is closed in the vehicle which energizes the motor 92 causing worm gear 94 to rotate drive gear 68 which rotates screw shaft 66. Rotation of screw shaft 66 causes ball nut 72 and tube 74 to be forced upward along screw shaft 66 extending screw 26. Since lid 24 is latched extensible screw 26 in extending will extend downward rotating lever 16 on pins 42 and 44 about bracket 10. Rotation of lever 16 about bracket 10 causes tension to be applied to cable 58 unlatching lid 24. On further movement of lever 16 stop 18 on bracket 10 is contacted and rotation of lever 16 is halted. Further driving of screw shaft 66 extending tube 74 will cause lid 24 which is now unlatched to open. The closing of the vehicle luggage compartment lid is accomplished by reversing the driving direction of motor 92.

The drawings and the foregoing specification constitute a description of the improved automatic luggage compartment lid control system in such full, clear, concise and exact terms as to enable any person skilled in the art to practice the invention, the scope of which is indicated by the appended claims.

What I claim as my invention is:

1. A lifting and unlatching device for the lid of a vehicle luggage compartment provided with latch means having a movable latch release member for holding the lid latched in closed positions, said device comprising a U-shaped bracket mounted in a fixed position within the luggage compartment with the ends thereof extending toward the lid, a lever including a pair of lever arms and a transversely extending connecting member rigidly maintaining the lever arms in spaced apart relation, one of said lever arms being longer than the other, pivot means extending through said lever arms and bracket ends pivotally supporting the lever between the bracket ends, stops secured to said bracket extending between the ends thereof and engageable with the lever at each side of the pivot means to limit pivotal movement thereof, a second U-shaped bracket secured to the lid, an axially extensible link one end of which is pivotally secured between the lever arms centrally of the longer of the lever arms, the other end of which extends between the ends of the second U-shaped bracket, said extensible link including a housing supported by said second pivot means, a thrust bearing within said housing, a screw shaft rotatably supported by said thrust bearing, worm and worm gear drive means for said screw shaft operably associated therewith, an extensible tube sleeved over said screw shaft having a high efficiency ball nut fixed to one end thereof in engagement with the screw shaft operable to permit manual movement between the tube and screw shaft on application of an axial force therebetween and providing for automatic movement therebetween on rotating of the screw shaft by the worm and worm gear, third pivot means securing the other end of said extensible tube between the ends of said second bracket, and a cable connected between said latch release member and the end of the long lever arm remote from the pivot connection thereof to the first mentioned bracket for releasing said latch means on initial pivoting of said lever on initial extension of said extensible link, said extensible link being operable on further extension thereof to pivot the lever into engagement with one of said stops and then to open said lid.

2. Structure as claimed in claim 1 and further including a pair of hinges mounting said lid and a torsion bar rigidly connected at opposite ends to said hinges, one of said hinges also being pivotally connected to said other end of the extensible tube for balancing of the forces applied to the lid by the extensible link.

References Cited in the file of this patent
UNITED STATES PATENTS

| | | |
|---|---|---|
| 2,352,929 | Worgess | July 4, 1944 |
| 2,682,780 | Pickles | July 6, 1954 |
| 2,715,545 | Orr | Aug. 16, 1955 |
| 2,768,532 | Russell | Oct. 30, 1956 |
| 2,797,434 | Vigmostad | July 2, 1957 |